Patented June 11, 1935

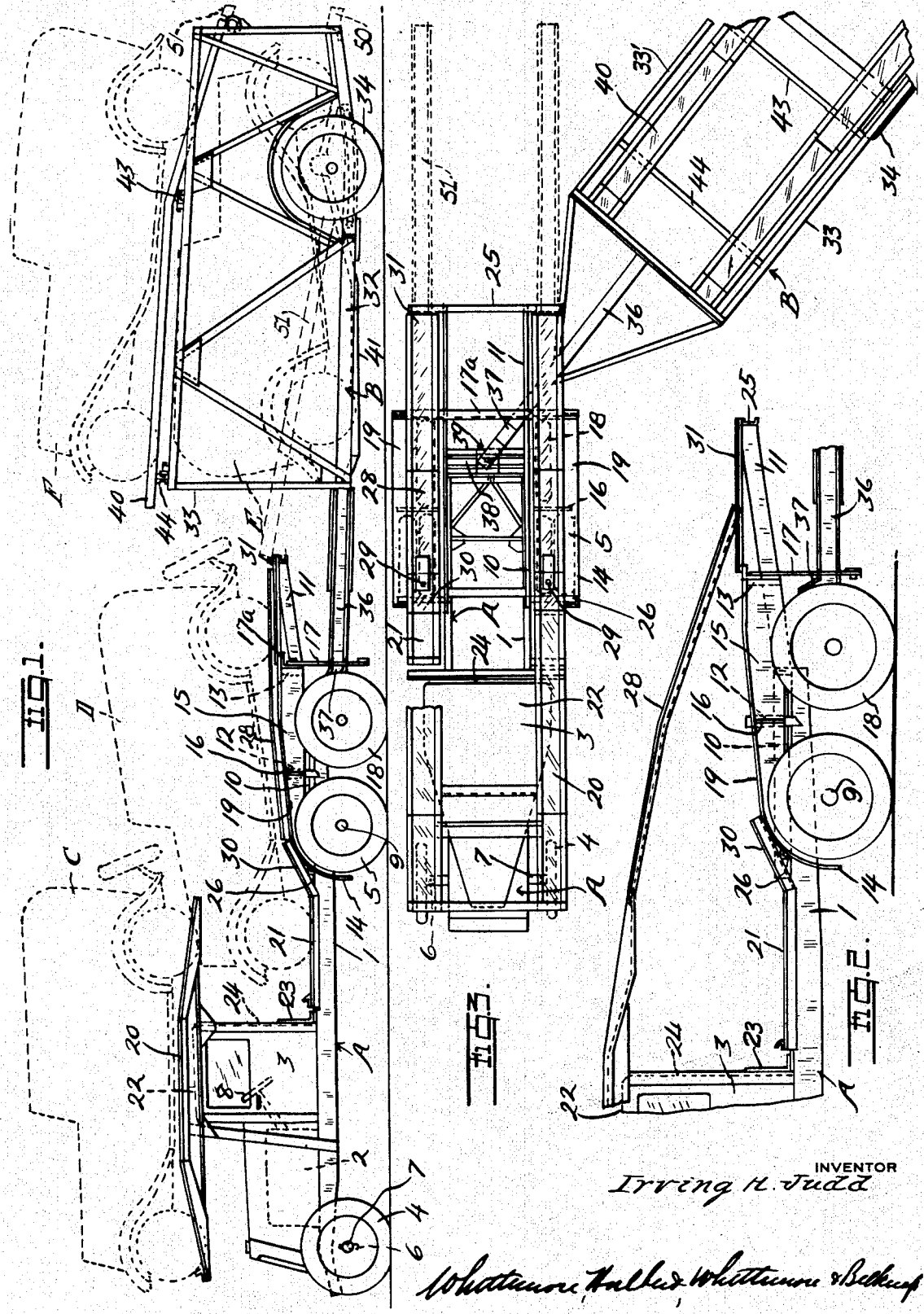

2,004,438

UNITED STATES PATENT OFFICE 2,004,438

TRANSPORTATION OF AUTOMOBILES

Irving H. Judd, Detroit, Mich., assignor to Whitehead & Kales Company, River Rouge, Mich., a corporation of Michigan Original application December 4, 1933, Serial No. 700,923. Divided and this application May 7, 1934, Serial No. 724,387

3 Claims. (Cl. 280—33.1)

This invention relates generally to the transportation of automobiles and constitutes a division of my application filed December 4, 1933, bearing Serial No. 700,923.

One of the essential objects of the invention is to provide a method of arranging automobiles for transportation in such manner that they can be carried on an articulated vehicle or trucktrailer combination in considerably less over-all space than is possible with heretofore known methods.

Another object is to provide a truck-trailer combination that is constructed in such a way that automobiles may be loaded onto the truck from either the trailer or from the ground, it being understood of course that the term "ground" as mentioned herein and defined in the claims may mean any suitable support.

Other objects, advantages and novel details of construction of this invention will be made more apparent as this description proceeds, especially when considered in connection with the accompanying drawing, wherein:

Figure 1 is a side elevation of a truck-trailer combination embodying my invention;

Figure 2 is a fragmentary elevation of the combination illustrated in Figure 1 with the portion 28 of the lower track inclined upwardly and connected to the rear end of the upper track 20;

Figure 3 is a top plan view of the combination when the truck is "jackknifed" relative to the trailer and is provided with skids so that automobiles may be loaded onto the truck without moving longituinally of the trailer.

Referring now to the drawing, A is the truck or leading section and B is the trailer or trailing section of an articulated vehicle embodying my invention. As shown, the truck A has a chassis frame 1 carrying an engine 2 and a driver's cab 3 and provided with front and rear groundengaging wheels 4 and 5 respectively. As usual, the front wheels 4 are mounted on spindles 6 pivotally connected to the front axle 7 and operable from a suitable steering wheel 8 within the cab. The rear wheels 5 are at opposite ends of the rear axle 9 and are dual wheels adapted to be driven in the usual way from the engine 2.

10 is an auxiliary frame mounted on and having a portion 11 inclining upwardly and rearwardly from the chassis frame 1. 12 and 13 respectively are uprights rigid with and projecting above the auxiliary frame 10, 14 are wheel fenders disposed upon the outer sides of and having depending portions 15 rigid with the uprights 12 and 13, and 16 are reinforcing gussets for the fenders. In this connection it will be noted that the fenders 14 are elongated in form so as to cover the front wheels 18 of the trailer as well as the rear wheels 5 of the truck, the rear end portions 17 of said fenders being formed of flexible or yieldable material such as rubber, rubber composition or weighted canvas and normally hanging in a vertical plane from an angle crossbar 17a rigid with the top portions 19 of said fenders. Thus, the flexible portions 17 will afford clearance when the trailer is being coupled or uncoupled. Moreover, the tops 19 of such fenders are slightly inclined as shown instead of being curved longitudinally.

Preferably the truck A is designed to carry two automobiles and for this purpose is provided with upper and lower tracks 20 and 21 respectively. As shown, the upper track 20 is mounted on and extends forwardly and rearwardly beyond the top 22 of the cab, while the lower track 21 is mounted on and extends forwardly and rearwardly beyond the inclined portions 19 of the wheel fenders. The upper track 20 is preferably of sufficient length to carry a 119" wheel base automobile C while the lower track 21 is sufficiently long to carry a 136" wheel base automobile D. In this connection it will be noted that the upper and lower tracks 20 and 21 are staggeredly arranged and that the lower track 21 extends from an angle iron 23 that crosses the chassis frame 1 at the back 24 of the cab to a channel crossbar 25 at the rear end of the auxiliary frame 10. Angle irons 26 project laterally from the auxiliary frame 10 in advance of the fenders 14 and cooperate with the angle iron 23 to support the track 21, while the angle bar 17a cooperates with the crossbar 25 to support the track. To facilitate loading of the upper track 20, an intermediate portion 28 of the lower track 21 is used as a skid between the tracks 21 and 20. Normally, this portion 28 is bolted at 29 to the inclined portion 30 of the lower track and is nested in the rear portion 31 of said track. However, when it is desired to load or unload the upper track 20, the portion 28 is detached from the inclined portion 30 of the lower track and is fastened to the rear end of the upper track, as illustrated in Figure 2.

The trailer B has a chassis frame 32 carrying upright side frames 33 and 33' and provided with front and rear ground-engaging wheels 18 and 34 respectively. Preferably, the chassis frame 32 at the forward ends of the upright side frames is Y-shaped in plan and the stem 36 of the Y has an upwardly offset portion 37 at its forward end extending over and connected to the front axle 38 of the trailer by a fifth wheel 39. The trailer B also carries two automobiles and for this purpose has upper and lower tracks 40 and 41 respectively which may be loaded by skids (not shown) from the ground. Preferably the lower track 41 is carried by the chassis frame 32 between the upright side frames 33 and 33' and is sufficiently long to carry a 130" wheel base automobile E, while the upper track 40 is carried by hingedly mounted crossbars 43 and 44 respectively on the side frames 33 and 33' and is sufficiently long to carry a 136" wheel base automobile F.

When loading the combination, the trailer B may be in alignment with the truck A as illustrated in Figure 1 or the truck A may be "jackknifed", i. e., turned at an angle relative to the trailer B as illustrated in Figure 3. When the parts are in alignment, the combination is loaded by first swinging the upper track 40 of the trailer upwardly over the upright side frame 33 to an inoperative position for clearance purposes and then driving automobile C from the ground up skids 50 attached to the rear end of the trailer over track 41 between the upright side frames 33 and 33' up skids 51 attached to portion 31 of track 21 onto track 21 on the truck, then up track section 28 (Figure 2) onto track 20. Track section 28 is then returned to nested position with section 31 of track 21. Automobile D is then driven from the ground up the skids 50 over track 41 between the upright side frames 33 and 33' up skids 51 onto track 21 beneath the rear end of automobile C (Figure 1). Skids 51 are then removed and automobile E is driven from the ground up skids 50 onto track 41. The track 40 is then returned to lowered operative position (Figure 1), and skids 51 are attached to the rear end thereof as illustrated by dotted lines in Figure 1. Finally automobile F is driven from the ground up skids 51 onto said track 40. When the truck A is "jackknifed" (Figure 3), then skids 51 are attached to portion 31 of track 21 with their lower rear ends upon the ground. Automobiles C and D are then driven from the ground up the skids 51 onto the tracks 20 and 21 respectively as aforesaid without moving over track 41 between the upright side frames 33 and 33' of the trailer. As an alternative in loading, when the truck A is "jackknifed" (Figure 3), the automobile E may be loaded first upon the lower track 41 of the trailer by moving the said automobile from the ground up skids 50 onto track 41, then the automobile F may be loaded upon the upper track of the trailer by moving said automobile from the ground up skids 51 onto track 40, then automobile C may be driven from the ground up skids 51 (Figure 3) over the rear portion 31 of track 21 up portion 28 (Figure 2) onto the upper track 20 of the truck and finally the automobile D may be loaded by moving it from the ground up skids 51 (Figure 3) onto the track 21. It is understood, of course, that portion 28 of track 21 is returned to its lowered position as illustrated in Figure 1 after automobile C has been loaded and before automobile D is loaded. Thus, larger automobiles having a greater overall width than the distance between the upright side frames 33 may be loaded onto tracks 20 and 21 when the truck is "jackknifed" as aforesaid.

What I claim as my invention is:

1. In a method of loading automobiles on an articulated vehicle in which the trailing section of the vehicle has a front axle in tandem with the rear axle of the leading section of the vehicle and both of said sections have upper and lower tracks, the lower track on the leading section extending over the tandem axles, the steps which consist of moving an automobile forwardly from the ground over the lower tracks of the trailing section and leading section in the order named onto the upper track of the leading section, then moving a second automobile forwardly from the ground over the lower track of the trailing section onto the lower track of the leading section to a position over said tandem axles, then moving a third automobile forwardly from the ground onto the lower track of the trailing section, and then moving a fourth automobile forwardly from the ground onto the upper track of the trailing section to a position over said third automobile.

2. In a method of loading automobiles on an articulated vehicle in which the trailing section of the vehicle has a front axle in tandem with the rear axle of the leading section of the vehicle and both of said sections have upper and lower tracks, the lower track on the leading section extending over the tandem axles, the steps which consist of jack-knifing the sections of said vehicle, moving an automobile forwardly from the ground over the lower track of the leading section onto the upper track of said leading section, moving a second automobile forwardly from the ground onto the lower track of the leading section to a position over said tandem axles, and then moving a third automobile from the ground onto the lower track of the trailing section, and then moving a fourth automobile forwardly from the ground onto the upper track of the trailing section to a position over said third automobile.

3. In a method of loading automobiles on an articulated vehicle in which the trailing section of the vehicle has a front axle in tandem with the rear axle of the leading section of the vehicle and both of said sections have upper and lower tracks, the lower track on the leading section extending over the tandem axles, the steps which consist of moving an automobile forwardly from the ground onto the lower track of the trailing section, then moving a second automobile forwardly from the ground onto the upper track of the trailing section to a position over the first automobile, then jack-knifing the sections of said vehicle, then moving a third automobile forwardly from the ground over the lower track of the leading section onto the upper track of said leading section, and then moving a fourth automobile forwardly from the ground onto the lower track of the leading section to a position over said tandem axles.

IRVING H. JUDD.